United States Patent [19]

Yu et al.

[11] Patent Number: 5,051,477
[45] Date of Patent: Sep. 24, 1991

[54] DYNAMICALLY CURED THERMOPLASTIC OLEFIN POLYMERS AND PROCESS FOR PRODUCING THE SAME

[75] Inventors: Thomas C. Yu, Chatham; Robert C. Puydak, Cranbury; Charles W. Degener, Toms River, all of N.J.

[73] Assignee: Advanced Elastomer Systems, L. P., St. Louis, Mo.

[21] Appl. No.: 519,041

[22] Filed: May 4, 1990

[51] Int. Cl.$^5$ .................... C08L 23/26; C08L 23/28; C08L 15/02; C08L 23/36; C08L 25/16
[52] U.S. Cl. ..................................... 525/194; 525/88; 525/192; 525/197; 525/198; 525/221; 525/227; 525/232; 525/240; 525/941; 524/525; 524/528
[58] Field of Search ....................... 525/194, 232, 240

[56] References Cited

U.S. PATENT DOCUMENTS

| | | | |
|---|---|---|---|
| 4,130,534 | 12/1978 | Coran et al. | 525/232 |
| 4,851,468 | 7/1989 | Hazelton et al. | 525/194 |
| 4,910,245 | 3/1990 | Flynn et al. | 525/194 |
| 4,978,703 | 12/1990 | Ainsworth et al. | 524/298 |

Primary Examiner—Carman J. Seccuro
Attorney, Agent, or Firm—Gordon B. Seward

[57] ABSTRACT

A dynamically vulcanized thermoplastic composition is provided which comprises a polymer blend of a polyolefin resin, a halogenated elastomeric copolymer, such as a halogenated butyl rubber, or a halogenated copolymer of a $C_4$ to $C_7$ isomonoolefin and a para-alkylstyrene, and a halogenated polyethylene. The composition has improved flame retarding properties. Additional flame retarding additives may be incorporated in the composition. The dynamically vulcanized thermoplastic composition is suitable for use in roofing sheets.

43 Claims, No Drawings

DYNAMICALLY CURED THERMOPLASTIC OLEFIN POLYMERS AND PROCESS FOR PRODUCING THE SAME

BACKGROUND OF THE INVENTION

1. Field of the Invention

The invention relates to dynamically vulcanized thermoplastic compositions having improved flame retarding properties and a process for preparing the compositions.

2. Description of Information Disclosures

In recent years, there has been a significant commercial interest in polymer blends which have a combination of both elastic and thermoplastic properties. These polymer blends have been given the generic designation of Thermoplastic Olefins ("TPO"). They exhibit some of the properties of a cured elastomer as well as the reprocessability of thermoplastic resins. The elastomeric characteristics are enhanced if one component of the blend is a vulcanizable elastomer which is wholly or partially crosslinked.

The earliest work in the curing of TPO compositions was by Gessler and Haslett; see U.S. Pat. No. 3,037,954. That patent teaches the concept of "dynamic curing" wherein a vulcanizable elastomer is dispersed into a resinous thermoplastic polymer and the elastomer cured while continuously mixing and shearing the polymer blend. The result is a micro-gel dispersion of cured rubber in an uncured matrix of resinous thermoplastic polymer. Gessler's U.S. Pat. No. 3,037,954 discloses compositions comprising polypropylene and a rubber wherein the rubber may be, butyl rubber, chlorinated butyl rubber, polybutadiene, polychloroprene and polyisobutene. Compositions of about 50 to 95 parts polypropylene and about 5 to 50 parts of rubber are disclosed.

U.S. Pat. No. 3,081,279 discloses compositions wherein a rubber, such as butyl rubber, or halogenated butyl rubber is compounded with a halosulfonated polyolefin and N-methyl-n-nitroso p-nitroso aniline. Subsequently, the compounded rubber is cured, preferably in a mold.

U.S. Pat. No. 2,369,471 disclosed blends of ethylene polymers with various hydrocarbon rubbers and halogenated rubbers which may be halogenated ethylene polymers. The compositions are uncured or, if desired, the blends may be further subjected to vulcanization employing known vulcanizing agents.

U.S. Pat. No. 4,141,878 discloses a thermoplastic elastomeric composition comprising a polyolefin resin and a crosslinked chlorosulfonated polyethylene rubber.

U.S. Pat. No. 4,286,079 discloses a curable composition comprising a chlorinated polyethylene, a sulfur curable rubber, which may be brominated butyl rubber, with or without a vinyl chloride resin, sulfur with or without a sulfur donor and at least one amino acid. The composition may be used in roofing sheets. See also U.S. Pat. No. 4,262,098.

When it is desired to use elastomeric thermoplastic compositions for roofing sheets, it is important to increase the flame retarding properties of these compositions.

It has now been found that the flame retarding properties of elastomeric thermoplastic compositions can be improved by dynamically vulcanizing a blend of specified polymers.

SUMMARY OF THE INVENTION

In accordance with the invention, there is provided a thermoplastic composition comprising a dynamically vulcanized polymer blend of a polyolefin resin, a halogenated elastomeric copolymer selected from the group consisting of a halogenated copolymer of a $C_4$ to $C_7$ isomonoolefin and a $C_4$ to $C_{14}$ multiolefin, a halogenated copolymer of a $C_4$ to $C_7$ isomonoolefin and a para-alkylstyrene, and mixtures thereof, and a halogenated polyethylene.

DETAILED DESCRIPTION OF THE INVENTION

The thermoplastic composition of the present invention comprises a polyolefin resin, a halogenated elastomeric copolymer selected from the group consisting of a halogenated copolymer of a $C_4$ to $C_7$ isomonoolefin and a $C_4$ to $C_{14}$ multiolefin, a halogenated copolymer of a $C_4$ to $C_7$ isomonoolefin and a para-alkylstyrene, and mixtures thereof, and a halogenated polyethylene which has been subjected to dynamic vulcanization.

The term "dynamic vulcanization" is used herein to connote a vulcanization process in which the polyolefin resin and a vulcanizable elastomer are vulcanized under conditions of high shear. As a result, the vulcanizable elastomer is simultaneously crosslinked and dispersed as fine particles of a "micro gel" within the polyolefin matrix.

Dynamic vulcanization is effected by mixing the TPO ingredients at a temperature which is at or above the curing temperature of the elastomer in equipment such as roll mills, Banbury ® mixers, continuous mixers, kneaders or mixing extruders, e.g., twin screw extruders. The unique characteristic of the dynamically cured compositions is that, notwithstanding the fact that the elastomer component may be fully cured, the compositions can be processed and reprocessed by conventional rubber processing techniques such as extrusion, injection molding, compression molding, etc. Scrap or flashing can be salvaged and reprocessed.

The dynamically vulcanized alloys (DVA) are generally prepared by blending together the polyolefin resin and elastomers with curatives and fillers under conditions of dynamic vulcanization.

In preparing the preferred dynamically vulcanized composition of the present invention, at least one polyolefin resin is blended with a halogenated elastomeric copolymer and a halogenated polyethylene.

The preferred polyolefin resins are high density polyethylene (HDPE) and polypropylene. While other polyolefin homopolymers and copolymers of ethylene can be utilized in the practice of this invention, the resulting DVA compositions are deficient in high temperature characteristics. Such other polyolefins include low density polyethylene (LDPE), linear low density polyethylene (LLDPE) and polybutylene (PB), as well as copolymers of ethylene with vinylacetate, acrylic acid, methyl acrylate, ethyl acrylate, etc. However, these other polyolefin resins can be incorporated into the DVA compositions of this invention along with the polypropylene ("PP") or polyethylene ("PE"). As used herein, the term "polypropylene" includes homopolymers of propylene as well as reactor copolymers of polypropylene (RCPP) which can contain about 1 to about 20 wt. percent ethylene or an alpha olefin comonomer of 4 to 16 carbon atoms. The polypropylene can be highly crystalline isotactic or syndiotactic polypropylene. The RCPP can be either a random or block copolymer. The density of the PP or RCPP can be about 0.80 to about 0.92 g/cc; generally about 0.89 to about 0.91 g/cc.

High density polyethylene (HDPE), useful as the polyolefin resin of this invention, generally has a density of about 0.94 to about 0.97 g/cc. High density polyethylene is an established product of commerce and its manufacture and general properties are well known in the art. Typically, HDPE has a relatively broad molecular weight distribution, characterized by the ratio of weight average molecular weight to number average molecular weight of from about 20 to about 40.

Polyolefin resins which may, optionally, be included in the compositions of this invention include polybutylene, LDPE and LLDPE as well as copolymers of ethylene with unsaturated esters of lower carboxylic acids. The term "polybutylene" generally refers to thermoplastic resins of both poly(1-butene)homopolymer and the copolymer with, for example, ethylene, propylene, pentene-1, etc. Polybutylene is manufactured via a stereo-specific Ziegler-Natta polymerization of monomer(s). Commercially useful products have high molecular weights and isotacticity. A variety of commercial grades of both homopolymer and ethylene copolymer are available with melt indices that range from about 0.3 to about 20 g/10 min.

The term "low density polyethylene" or "LDPE" as used herein mean both low and medium density polyethylene having densities of about 0.91 to about 0.94 g/cc. The terms include linear polyethylene as well as copolymers of ethylene which are thermoplastic resins.

Linear low density polyethylene (LLDPE) is characterized by little, if any, long chain branching, in contrast to conventional LDPE. The processes for producing LLDPE are well known in the art and commercial grades of this polyolefin resin are available. Generally, it is produced in gas-phase fluidized bed reactors or liquid-phase solution process reactors; the former process can be carried out at pressures of about 100 to 300 psi and temperatures as low as 100° C.

The preferred halogenated polyethylene suitable as component of the composition of the invention is chlorinated polyethylene, preferably an elastomeric halogenated polyethylene. The halogen content of the halogenated polyethylene may range from about 5 to about 50 weight percent, preferably from about 20 to about 45 weight percent. The halogen may be bromine, chlorine and mixtures therein. The preferred halogen is chlorine. The halogenated polyethylene component may be an amorphous elastomeric polymer or a crystalline polymer. Suitable halogenated polyethylene polymers include amorphous elastomeric chlorinated polyethylene having a Mooney Viscosity of 20 to 80 (ML 1+4) at 121° C., and a heat of fusion of less than about 3 calories per gram; and crystalline chlorinated polyethylene having a Mooney Viscosity of at least 100, preferably at least 120 (ML 1+4) at 121° C., and a heat of fusion of at least about 11 calories per gram. The preferred halogenated polyethylene is an amorphous elastomeric chlorinated polyethylene.

Suitable halogenated copolymers of a $C_4$ to $C_7$ isomonoolefin and a $C_4$ to $C_{14}$ multiolefin for use as component of the composition of the present invention are known polymers and can be produced by the halogenation of the corresponding copolymer. The halogenated copolymer of a $C_4$ to $C_7$ isomonoolefin and a $C_4$ to $C_{14}$ multiolefin will be referred to herein as "halogenated butyl rubber."

The term "butyl rubber" is used herein to designate a copolymer of an isoolefin and a conjugated multiolefin. Suitable butyl rubber comprises a major portion of an isoolefin and a minor amount, preferably not more than about 30 weight percent of a conjugated multiolefin. The preferred copolymers comprise about 85–99.5 wt. percent (preferably 95–99.5 wt. percent) of a $C_4$–$C_7$ isoolefin, such as isobutylene, and about 15–0.5 wt. percent (preferably about 5–0.5 wt. percent) of a multiolefin of about 4–14 carbon atoms. These copolymers are referred to in publications as "butyl rubber". The term "butyl rubber" as used herein includes the aforementioned copolymers of an isoolefin having 4 to 7 carbon atoms and about 0.5 to 20 wt. percent of a conjugated multiolefin of about 4 to 10 carbon atoms. Preferably these copolymers contain about 0.5 to about 5 percent conjugated multiolefin. The preferred isoolefin is isobutylene. Suitable conjugated multiolefins include isoprene, butadiene, dimethyl- butadiene, piperylene, etc. The preferred conjugated multiolefin is isoprene. Commercial butyl rubber is a copolymer of isobutylene and minor amounts of isoprene.

To produce the halogenated butyl rubber, a butyl rubber, as described above, is reacted with a halogenation agent, such as chlorine or bromine. Processes for producing halogenated butyl rubber are well known and are described for example, in U.S. Pat. Nos. 3,029,191; 2,940,960, and 3,099,644, the teachings of all of which are hereby incorporated by reference.

Suitable halogenated copolymers of a $C_4$ to $C_7$ isomonoolefin and a para-alkylstyrene include copolymers comprising para-alkystyrene units which may be represented by the formula:

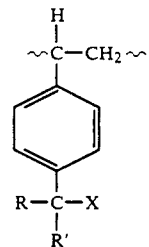

where R and R' are independently selected from the group consisting of hydrogen, alkyl groups having about 1 to about 5 carbon atoms, and primary and secondary alkyl halides having about 1 to about 5 carbon atoms, and X is selected from the group consisting of bromine and chlorine and mixtures thereof, such as those disclosed in European Patent Application 89305395.9 filed May 26, 1989 (Publication No. 0344021 published Nov. 29, 1989).

Preferably the alkylstyrene copolymer is a halogenated copolymer of isobutylene and para-methylstyrene, more preferably, the brominated copolymer of isobutylene and para-methylstyrene.

Suitable halogenated elastomeric copolymer for use as component of the composition of the present invention may comprise from about 0.1 to 10 weight percent halogen, preferably from about 0.5 to 3 weight percent halogen. The preferred halogen is bromine.

In the dynamically vulcanized thermoplastic elastomeric composition of the present invention, the polyolefin resin may suitably be present in an amount ranging from about 12 to 40 weight percent, preferably from about 15 to 30 weight percent, the halogenated elastomeric copolymer may be present in an amount ranging from about 10 to 40 weight percent, preferably from about 15 to 25 weight percent, and the halogenated polyethylene may be present in an amount ranging from about 5 to about 35 weight percent, preferably from about 10 to 20 weight percent, based on the total composition.

The term "polymer blend" is used herein to denote the blend of the polyolefin resin, the halogenated elastomeric copolymer and the halogenated polyethylene.

The preferred dynamically vulcanized alloy (DVA) composition of the invention comprises polypropylene, bromobutyl rubber, and chlorinated polyethylene.

The halogenated polyethylene component improves the flame retardant properties of the present composition and may also serve as compatibilizer for other optional flame retardant additives. Furthermore, when it is desired to obtain a composition that has a decreased tendency to discolor when exposed to sunlight, such as for use in roofing sheets, it is preferred to use chlorinated polyethylene as the halogenated polyethylene component of the composition.

The polymer blend may comprise about 40 to about 70 wt. percent of the overall DVA composition. In addition to its polymer components, the DVA composition of the present invention may comprise flame retardants, fillers, antioxidants, stabilizers, rubber processing oils lubricants (e.g., oleamide), antiblocking agents, waxes, foaming agents, pigments, coupling agents for the fillers and other processing aids known to the rubber compounding art. Metal oxides, e.g., MgO, can be included to act as acid acceptors. The pigments and fillers may comprise up to 30 wt. percent of the total DVA composition based on polymer components plus additives. Preferably, the pigments and fillers comprise about 1 to about 30 wt. percent based on the DVA composition, more preferably about 2 to about 20 weight percent of the overall composition.

Fillers may be inorganic fillers such as talc, calcium carbonate, clays, silica or carbon black and mixtures thereof. Any type of carbon black can be used, such as channel blacks, furnace blacks, thermal blacks, acetylene black, lamp black and the like.

Rubber process oils have particular ASTM designations depending on whether they fall into the class of paraffinic, naphthenic or aromatic process oils. The type of process oil utilized will be that customarily used in conjunction with the rubber component. The skilled rubber chemist will recognize which type of oil should be utilized with a particular rubber. The quantity of rubber process oil utilized is based on the total rubber content, and can be defined as the ratio, by weight, of process oil to the rubber in the DVA which is to be dynamically vulcanized. This ratio can vary from about 0.3/1 to about 1.3/1; preferably about 0.5/1 to about 1.2/1; more preferably about 0.8/1 to about 1.1/1. Oils other than petroleum based oils such as oils derived from coal tar and pine tar can also be utilized. In addition to the petroleum derived rubber process oils, organic esters and other synthetic plasticizers can be used. As used herein, the term "process oil" means both the petroleum derived process oils and synthetic plasticizers.

The process oil may be included in the DVA to insure that the DVA has good flow properties, e.g., spiral test flow reading of at least 16 cm. The quantity of oil utilized will depend in part on the amount of polymer blend and filler used as well as, to some extent, the type of cure system utilized. Generally, the process oil, when included, may comprise about 20 wt. percent of the DVA. Larger amounts of process oil can be used, the deficit being reduced physical strength of the DVA.

Alternatively, and preferably, the process oil may be omitted from the composition of the present invention, and replaced by a chlorinated paraffin oil flame retardant.

A suitable chlorinated paraffin oil may have a chlorine content of about 42 weight percent and a volatility, % loss, in 4 hours at 150° C. of about 1.5 and in 24 hours at 100° C. of about 0.8.

When a chlorinated paraffin oil is used instead of the process oil in the thermoplastic composition of the invention, the weight ratios of chlorinated paraffin oil to total content of halogenated elastomeric copolymer (as defined herein) plus halogenated polyethylene may range from about 0.3:1 to about 1:1, preferably from about 0.5:1 to about 0.7:1. A preferred composition of the present invention comprises a chlorinated paraffin oil (flame retardant), as well as a solid flame retardant, preferably a chlorinated solid flame retardant. Optionally and preferably, a coagent or synergist for the chlorinated paraffin oil and/or for the chlorinated solid flame retardant may also be included in the composition of the present invention. Suitable coagents include antimony oxide, such as, for example, the material available from M&T Chemicals under the name of Thermogard S.

When solid flame retardants are included in the composition of the present invention, then it is also preferable to include an ethylene-vinyl acetate copolymer (EVA) to aid in dispersing the solid flame retardants in the polyolefin resin phase.

Suitable solid flame retardants include chlorine-containing crystalline organic compounds such as 1,2,3,4,7,8,9,10,13,14,14-dodecahydro-1,4,4a,5, 6a, 7, 10, 10a, 11,12,12a- a dodecahydro 1, 4, 7, 10-dimethanodibenzo (a,e) cyclooctene.

Suitable ethylene-vinyl acetate copolymers may comprise from about 9 to 60 weight percent vinyl acetate.

The chlorinated paraffin oil may be present in the total composition in an amount ranging from about 10 to about 30, preferably from about 15 to about 25 weight percent.

The solid flame retardant may be present in the total composition in an amount ranging from about 5 to about 25, preferably from about 10 to about 15 weight percent.

The ethylene-vinyl acetate copolymer may be present in the composition in an amount ranging from about above 0 to about 10, preferably from about 1 to about 5 weight percent.

Antioxidants may be utilized in the composition of this invention. The particular antioxidant utilized will depend on the rubbers and plastics utilized and more than one type may be required. Their proper selection is well within the skill of the rubber chemist. Antioxidants will generally fall into the class of chemical protectors or physical protectants. Physical protectants are used where there is to be little movement in the part to be manufactured from the composition. These are generally waxy materials which impart a "bloom" to the surface of the rubber part and form a protective coating or shield the part from oxygen, ozone, etc.

The chemical protectors generally fall into three chemical groups: secondary amines, phenolics and phosphites. Illustrative, non-limiting examples of types of antioxidants useful in the practice of this invention are hindered phenols, amino phenols, hydroquinones, alkyldiamines, amine condensation products, etc. Non-limiting examples of these and other types of antioxidants are styrenated phenol; 2,2'-methylene-bis-(4-methyl-6-1, butylphenol); 2,6'-di-t-butyl-o-dimethylamino-p-cresol; hydroquinone monobenzyl ether, octylated diphenyl amine, phenyl-beta-naphthlylamine; N,N'-diphenylethylene diamine; aldol-alpha-naphthylamine; N,N'-di-phenyl-p-phenylene diamine, etc. The physical antioxidants include mixed petroleum waxes and microcrystalline waxes.

Any conventional cure system, which is capable of vulcanizing at least the halogenated elastomeric copolymer selected from the group consisting of a halogenated copolymer of a $C_4$ to $C_7$ isomonoolefin and a $C_4$ to $C_{14}$ multiolefin; a halogenated copolymer of a $C_4$ to $C_7$ isomonoolefin and a para-alkylstyrene, and mixtures thereof and which does not degrade the halogenated polyethylene, may be used for the dynamic vulcanization Thus, it is preferred to use a cure system that does not include zinc oxide. More preferably, a curing system which is capable of vulcanizing simultaneously said halogenated elastomeric copolymer and the halogenated polyethylene is used for the dynamic vulcanization which is carried out in the presence of the polyolefin resin, except that peroxide cures are specifically excluded from the practice of this invention. Under conditions which would result in a fully cured rubber using peroxide, the polypropylene resin would depolymerize, thereby resulting in a lower strength composition having little temperature resistance. Suitable cure systems include a mercaptothiazole derivative curing agent and an accelerator, such as a butyraldehyde aniline condensation product; and a hexamethylene diamine carbamate curing agent. A commercially available mercaptothiazole curing agent is, for example, ECHO-S ® (Hercules), a vulcanizing agent comprising a mercaptothiazole derivative. A commercially available butyraldehyde condensation product is, for example, VANAX ® 808 (R. T. Vanderbilt Company). A commercially available hexamethylene diamine carbamate curing agent is DIAK ® #1 (Dupont Co.)

The dynamic vulcanization is conducted at conditions to vulcanize at least partially the halogenated elastomeric copolymer, preferably at conditions to covulcanize the halogenated elastomeric copolymer and the halogenated polyethylene at least partially, most preferably fully.

In the practice of this invention, the polyolefin resin and other polymers are mixed together at a temperature sufficient to soften the resin or, more commonly, at a temperature above its melting point where the resin is crystalline at room temperature, e.g., PP. After the resin and other polymers have been intimately mixed, the curative is added. Heating and masticating at vulcanization temperatures are generally adequate to complete vulcanization in about 0.5 to about 10 minutes. The vulcanization time can be reduced by elevating the temperature of vulcanization. A suitable range of vulcanization temperatures is from about the melting point of the resin (about 130° C. in the case of HDPE and about 165° C. in the case of PP) to about 250° C.; more typically, the temperature may range from about 150° C. to about 230° C. Preferably the vulcanization is carried out at a temperature range from about 160° C. to about 180° C.

It is preferred that the mixing process be continued until the desired level of vulcanization is complete. If vulcanization is permitted to continue after mixing has stopped, the composition may not be reprocessable as a thermoplastic. However, the dynamic vulcanization can be carried out in stages. For example, vulcanization can be commenced in a twin screw extruder and pellets formed of the DVA material using an underwater pelletizer thereby quenching the vulcanization before it is completed. It can be completed at a latter time under dynamic vulcanization conditions. Those skilled in the art will appreciate the appropriate quantities, types of curatives and extent of mixing time required to carry out the vulcanization of the rubber. Where necessary the rubber alone can be vulcanized using varying amounts of curative to determine the optimum cure system to be utilized and the appropriate cure conditions to achieve a full cure.

While it is preferred that all components be present in the mix prior to carrying out the dynamic vulcanization process of this invention, this is not a necessary condition. For example, in one embodiment, the rubber to be cured can be dynamically vulcanized in the presence of some or all of the polyolefin resin This blend can then be let down into additional polyolefin resin. Similarly, it is not necessary to add all of the fillers and oil prior to dynamic vulcanization. Some or all of the fillers and oil can be added after the vulcanization is completed.

The term "rubber" is used herein interchangeably with "elastomer".

The term "fully vulcanized" as used herein with respect to the dynamically vulcanized rubber components of this invention means that the rubber components to be vulcanized have been cured to a state in which the physical properties of the rubber are developed to impart elastomeric properties to the rubber generally associated with the rubbers in their conventionally vulcanized state. The degree of cure of the vulcanized rubber can be described in terms of gel content or conversely extractable components. Alternatively, the degree of cure can be expressed in terms of cross-link density.

Where the determination of extractables is an appropriate measure of the state of cure, the improved thermoplastic elastomeric compositions are produced by vulcanizing the curable rubber components of the blends to the extent that they contain no more than about four percent by weight of the cured rubber components extractable at room temperature by a solvent which dissolves the rubbers which are intended to be vulcanized, and preferably to the extent that the composition contains less than two percent by weight extractable. In general, the less extractables of the cured rubber components, the better are the properties and still more preferable are compositions comprising essentially no extractable rubber from the cured rubber phase (less than 0.5 weight percent). Gel content reported as percent gel is determined by a procedure which comprises determining the amount of insoluble polymer by soaking the specimen for 48 hours in organic solvent at room temperature and weighing the dried residue and making suitable corrections based upon knowledge of the composition. Thus, corrected initial and final weights are obtained by subtracting from the initial weight, the weight of soluble components, other than the rubber to be vulcanized, such as extender oils, plasticizers and components of the composition soluble in organic solvent as well as that rubber component of the DVA which is not intended to be cured. Any insoluble pigments, fillers, etc., are subtracted from both the initial and final weights.

To employ cross-link density as the measure of the state of cure which characterizes the improved thermoplastic elastomeric compositions, the blends are vulcanized to the extent which corresponds to vulcanizing the same rubber as in the blend statically cured under pressure in a mold with such amounts of the same curatives as in the blend and under such conditions of time and temperature to give an effective cross-link density greater then about $3 \times 10^{-5}$ moles per milliliter of rubber and preferably greater than about $5 \times 10^{-5}$ or even more preferably $1 \times 10^{-4}$ moles per milliliter of rubber. The blend is then dynamically vulcanized under similar conditions with the same amount of curative based on the rubber content of the blend as was required for the rubber alone. The cross-link density so determined may be regarded as a measure of the amount of vulcanization which gives the improved thermoplastics. However, it should not be assumed, from the fact that the amount of curative is based on the rubber content of the blend and is that amount which gives the rubber alone the aforesaid cross-link density, that the curative does not react with the resin or that there is no reaction between the resin and rubber. There may be highly significant reactions involved but of limited extent. However, the assumption that the crosslink density determined as described provides a useful approximation of the cross-link density of the thermoplastic elastomeric compositions is consistent with the thermoplastic properties and with the fact that a large proportion of the resin can be removed from the composition by high temperature solvent extraction, for example, by boiling decalin extraction.

The cross-link density of the rubber is determined by equilibrium solvent swelling using the Flory-Rehner equation, as shown in J. Rubber Chem. and Tech. 30, p. 929. The appropriate Huggins solubility parameters for rubber solvent pairs used in the calculation were obtained from the review article by Sheehan and Bisio, J. Rubber Chem. & Tech. 39, 149. If the extracted gel content of the vulcanized rubber is low, it is necessary to use the correction of Bueche wherein the term v is multiplied by the gel fraction (% gel/100). The cross-link density is half the effective network chain density v determined in the absence of resin. The cross-link density of the vulcanized blends will, therefore, be hereinafter understood to refer to the value determined on the same rubber as in the blend in the manner described. Still more preferred compositions meet both of the aforedescribed measures of state of cure, namely, by estimation of cross-link density and percent of rubber extractable.

A preferred composition of this invention comprises polypropylene as the polyolefin resin, a brominated butyl rubber, and a chlorinated polyethylene, a chlorinated paraffin oil as flame retardant and a solid chlorinated flame retardant, the brominated butyl rubber and chlorinated polyethylene having been vulcanized in the presence of the polyolefin resin utilizing a curing system capable of vulcanizing simultaneously (covulcanizing) the brominated butyl rubber and chlorinated polyethylene.

The thermoplastic compositions of the present invention are particularly suitable for use in roofing sheets.

PREFERRED EMBODIMENTS

The following examples are presented to illustrate the invention. All parts and percentages herein are by weight unless specifically stated otherwise.

EXAMPLE 1

A dynamically vulcanized thermoplastic composition was prepared by curing at a temperature of about 170° C., for 5 to 6 minutes, a bromobutyl rubber, comprising about 2 weight percent bromine, a chlorinated polyethylene polymer comprising about 36 weight percent chlorine, polypropylene, fillers, additives, stabilizers, naphthenic oil and a curing system comprising hexamethylene diamine carbamate.

About ⅔ of the oil was added before vulcanization and about ⅓ of the oil was added after vulcanization. The naphthenic oil was of a ASTM Type designation 104A, having a gravity °API of about 27.3. The bromobutyl rubber had a bromine content of about 2 weight % and a Mooney viscosity (in accordance with test ASTM D 1646) of about 37±5 ML 1+8 at 125° C.

The polypropylene had a total ethylene content of about 8 to 11 wt. % and a melt/flow rate of about 0.3 to 0.6 at 230° C. The chlorinated polyethylene had a chlorine content of about 36 wt. % and a Mooney Viscosity (ASTM D1646) of about 68 ML (1+4) 121° C.

The stabilizers used were heat and ultraviolet light stabilizers which include Bis(2,2,6,6-tetramethyl-4-piperidyl) sebacate, i.e., Tinuvin ® 770 from Ciba Geigy; Bis(2,3,di-t-butyl-phenyl) pentaerythritol diphosphite, i.e., Ultranox 626 from Borg Warner, now General Electric Co., Tris(4-tert-butyl-3 hydroxy-2,6-dimethylbenzyl)-S-triazine-2,4,6-(1H, 3H, 5H)-trione, i.e., CYANOX 1790 from American Cyanamid, and 2-(3', 5'-di-tert-butyl-2,-hydroxyphenol)-5-chlorobenzotriazole, i.e., TINUVIN 327 from Ciba Geigy.

The resulting vulcanized composition is shown in Table I.

TABLE I

| DVA No. 1 | |
|---|---|
| Components | Amounts |
| Bromobutyl 2244 rubber | 15 |
| chlorinated polyethylene (Tyrin CPE 552) | 27 |
| polypropylene (Escorene PD 7031) | 17 |
| magnesium oxide | 0.5 |
| calcium carbonate | 9.2 |
| titanium dioxide | 3.0 |
| stearic acid | 0.5 |
| stabilizers | 0.8 |
| naphthenic oil | 25 |
| curing system[1] | 1.5 |

[1]The curing system comprised hexamethylene diamine carbamate

The DVA No. 1 composition, which is a composition in accordance with the present invention, was tested. The results of these tests were as follows:

| Physical Properties, Injection Molded | |
|---|---|
| Hardness, Shore A-ASTM D2240 at 5 sec. | 76 |
| Tensile strength, psi - ASTM D412 | 1,110 |
| Elongation, % - ASTM D 395 | 370 |
| Compression Set B - ASTM D 395 22 hr. at 70° C. | 52 |
| Volume Swell - ASTM D 471 70 hr at 100° C. in ASTM #3 oil, % | 89 |

EXAMPLES 2 TO 5 added to the composition after the vulcanization step. The results of the test are summarized in Table II.

TABLE II

| A | B | C<br>Example 2 | D<br>Example 3 | E<br>Example 4 |
|---|---|---|---|---|
| Trade name | Chemical Name | | | |
| Polymer | | | | |
| Bromobutyl 2244 (1) | Bromobutyl Rubber | 20 (17.8%) | 20 (19.9%) | 20 (21%) |
| Escorene PD 7031 (2) | See Footnotes | 18 (16.0) | 18 (17.9) | 18 (18.9) |
| Tyrin CPE 552 (3) | Chlorinated Polyethylene | 15 (13.3) | 15 (14.9) | 15 (15.8) |
| Pigment | | | | |
| Tronox CR-834 | Titanium Dioxide | 2.5 (2.2) | 2.5 (2.5) | 2.5 (2.6) |
| Heat & UV Stabilizers | | | | |
| Irganox 3114 (4) | See Footnotes | 0.2 (0.18) | 0.2 (0.2) | 0.2 (0.21) |
| Tinuvin 770 (5) | See Footnotes | 0.2 (0.18) | 0.2 (0.2) | 0.2 (0.21) |
| Ultranox 626 (6) | See Footnotes | 0.2 (0.18) | 0.2 (0.2) | 0.2 (0.21) |
| Chimassorb 994 (7) | See Footnotes | 0.25 (0.22) | 0.25 (0.25) | 0.25 (0.25) |
| Flame Retardant | | | | |
| Paroil 140 (8) | Chlorinated paraffin oil | 22 (19.5) | 22 (21.9) | 16 (16.8) |
| Dechlorane Plus 25 (9) | See Footnotes | 17 (15.1) | 12 (11.9) | 12 (12.6) |
| Ultrathene UE 636 (10) | See Footnotes | 2.4 (2.1) | 2.4 (2.4) | 2.4 (2.5) |
| Thermoguard S | Antimony oxide | 12 (10.7) | 6 (5.9) | 6 (6.3) |
| Vulcanization Package | | | | |
| Maglite D | Magnesium Oxide | 0.85 (0.76) | 0.85 (0.85) | 0.85 (0.89) |
| Echo S (11) | See Footnotes | 1 (0.89) | 0.6 (0.6) | 0.6 (0.63) |
| VANAX 808 (12) | See Footnotes | 1 (0.89) | 0.4 (0.4) | 1 (1.1) |
| | TOTAL PARTS | 112.6 (100%) | 100.6 (100%) | 95.2 (100%) |
| PROPERTY | TEST METHOD | | | |
| Oxygen Index | ASTM D 2863 | 28 | 26 | 26.5 |
| Tear Strength, lb/in | ASTM D 624-Die C | 138 | 171 | 175 |
| Hardness, Shore A @ 5 sec. | ASTM D 2240 | 80 | 82 | 82 |
| Tensile @ break, psi | ASTM D 412 | 817 | 1093 | 1122 |
| Elongation @ break, % | ASTM D 412 | 275 | 375 | 421 |
| 100% Molulus, psi | ASTM D 412 | 3.2 | 3.8 | 3.7 |
| 300% Molulus, psi | ASTM D 412 | 817 | 970 | 875 |
| Compression set B-22 hrs. @ 70 Degree, C. % | ASTM D 395 | 57.6 | 58.8 | 62 |

Footnotes:
In Table II, the numbers in parentheses are weight percent. The other numbers are formula weights in which the polymer weight has been kept constant.
(1) Exxon Bromobutyl grade 2244 (Exxon Chemical Company), comprises about 2 wt. % bromine.
(2) Escorene PD 7031, is a Polypropylene Random Copolymer (Exxon Chemical Co.), 0.3 to 0.6 melt flow rate at 230° C., total ethylene about 8 to 11 wt. %.
(3) Tyrin CPE 552 (Dow Chemical Co.) is a randomly chlorinated linear polyethylene; 36 wt. % chlorine; Mooney Viscosity ML (1 + 4) at 121° C. of 68; a specific gravity of 1.16.
(4) Irganox 3114 (Ciba Geigy) denotes Tris (3,5-di-tertbutyl-4-hydroxbenzyl) isocynanurate.
(5) Tinuvin 770 (Ciba Geigy) denotes Bis (2,2,6,6-Tetramethyl-4-piperidyl) sebacate.
(6) Ultranox 626 (Borg Warner, now General Electric Co.) denotes Bis (2,4di-t-butylphenyl pentaerythritol diphosphite.
(7) Chimassorb 944 (Ciba Geigy) is N,N'-bis(2,2,6,6-Tetramethyl-4-piperidinyl)-1,6-hexanediamine polymer with 2,4,6-trimethyl-1,2-pentanamine.
(8) Paroil 40 (Dover Chemical) is a liquid chlorinated paraffin oil having a volatility, % loss of 1.5 after 4 hours at 15° C. and a % loss of 0.8 after 24 hours at 100° C.
(9) Dechlorane Plus 25 (Occidental Chemical Corp.) is a crystalline solid of average particle diameter of 5 microns maximum (Fischer Subsieve Sizer). It is 1,2,3,4,7,8,9,10,13,13,14,14-dodecachloro,-1,4,4a,5,6,6a,7,10,10a,11,12,12a-dodecahydro-1,4:7,10-dimethanodibenzo(a,e) cyclooctene.
(10) Ultrathene UE 636 (Quantum Chemical Co.) is an ethylene-vinyl acetate copolymer comprising about 78 wt. % vinyl acetate.
(11) Echo S (Hercules Inc.) is a vulcanizing agent comprising a mercaptothiazole derivative.
(12) VANAX 808 (R. T. Vanderbilt Company) is a butyraldehyde-aniline condensation product used as curing accelerator.

Dynamically vulcanized compositions were prepared as follows. The components shown in Table II were used to prepare a mixture.

Each of the mixtures was compounded in a Banbury ® mixer using a three stage technique. In the first step, all ingredients except the curative system and the liquid chlorinated paraffin were brought to a flux. Thereafter, the curative system was introduced to cure the bromobutyl rubber and the chlorinated polyethylene. After four minutes of curing time, the liquid chlorinated paraffin oil was added. The pelletized sample was subsequently extruded into a 4" by 0.15" ribbon. Test specimens were also injection molded on a Boy machine for Oxygen Index measurement according to ASTM test D 2863. The Oxygen Index measurement is used as an indicator of flame retarding properties. It should be noted that the chlorinated paraffin oil was

What is claimed is:

1. A thermoplastic composition comprising a dynamically vulcanized polymer blend of (I) a polyolefin resin, (II) a halogenated elastomeric copolymer selected from the group consisting of a halogenated copolymer of a $C_4$ to $C_7$ isomonoolefin and a $C_4$ to $C_{14}$ multiolefin, a halogenated copolymer of a $C_4$ to $C_7$ isomonoolefin and a para-alkylstyrene, and mixtures thereof, and (III) a halogenated polyethylene.

2. The thermoplastic composition of claim 1, wherein said polyolefin resin is present in an amount ranging from about 12 to 40 weight percent, said halogenated elastomeric copolymer is present in an amount ranging from about 10 to 40 weight percent and said halogenated polyethylene is present in an amount ranging from 5 to 35 weight percent, based on the total composition.

3. The thermoplastic composition of claim 1, wherein said polyolefin resin is present in an amount ranging from about 15 to 30 weight percent, said halogenated elastomeric copolymer is present in an amount ranging from about 15 to 25 weight percent and said halogenated polyethylene is present in an amount ranging from about 10 to 20 weight percent, based on the total composition.

4. The thermoplastic composition of claim 1, wherein said halogenated elastomeric copolymer and said halogenated polyethylene are present in said composition as particles dispersed in said polyolefin resin.

5. The thermoplastic composition of claim 1, wherein at least said halogenated elastomeric copolymer is at least partially vulcanized.

6. The thermoplastic composition of claim 1, wherein each of said halogenated elastomeric copolymer and said halogenated polyethylene is at least partially vulcanized.

7. The thermoplastic composition of claim 1, wherein each of said halogenated elastomeric copolymer and said halogenated polyethylene is fully vulcanized.

8. The thermoplastic composition of claim 1, wherein said halogenated polyethylene is selected from the group consisting of chlorinated polyethylene, brominated polyethylene, and mixtures thereof.

9. The thermoplastic composition of claim 1, wherein said halogenated polyethylene is chlorinated polyethylene.

10. The thermoplastic composition of claim 1, wherein said polyolefin resin is selected from the group consisting of polyethylene, polypropylene and mixtures thereof.

11. The thermoplastic composition of claim 1, wherein said polyolefin resin is polypropylene.

12. The thermoplastic composition of claim 1, wherein said halogenated elastomeric copolymer is selected from the group consisting of a brominated elastomeric copolymer, a chlorinated elastomeric copolymer, and mixtures thereof.

13. The thermoplastic composition of claim 1, wherein said halogenated elastomeric copolymer is a brominated elastomeric copolymer.

14. The thermoplastic composition of claim 1, wherein said halogenated copolymer of an isomonoolefin and a multiolefin is a halogenated copolymer of isobutylene and isoprene.

15. The thermoplastic composition of claim 1, wherein said halogenated copolymer of an isomonoolefin and a para-alkylstyrene is a halogenated copolymer of isobutylene and para-methylstyrene.

16. The thermoplastic composition of claim 1, also comprising a flame retardant additive.

17. The thermoplastic composition of claim 16, wherein said flame retardant additive is a halogenated paraffinic oil.

18. The thermoplastic composition of claim 16, wherein said flame retardant additive is a solid flame retardant additive.

19. The thermoplastic composition of claim 16, wherein said flame retardant additive is selected from the group consisting of a chlorinated paraffin oil, a solid chlorinated organic compound, and mixtures thereof.

20. The thermoplastic composition of claim 19, wherein said polyolefin resin is polypropylene, said halogenated elastomeric copolymer is a brominated elastomeric copolymer, and said halogenated polyethylene is chlorinated polyethylene.

21. The thermoplastic composition of claim 20, wherein said brominated elastomeric copolymer is a brominated copolymer of isobutylene and isoprene.

22. The thermoplastic composition of claim 16, wherein said flame retardant additive comprises a solid chlorinated organic compound, and wherein said thermoplastic composition additionally comprises an ethylene-vinyl acetate copolymer.

23. The thermoplastic composition of claim 1, also comprising fillers, and other rubber compounding additives.

24. A process for preparing a vulcanized thermoplastic composition, which comprises the steps of:
   (a) blending (I) a polyolefin resin, (II) an unvulcanized halogenated elastomeric copolymer selected from the group consisting of a halogenated copolymer of a $C_4$ to $C_7$ isomonoolefin and a $C_4$ to $C_{14}$ multiolefin, a halogenated copolymer of a $C_4$ to $C_7$ isomonoolefin and a para-alkylstyrene, and mixtures thereof, (III) an unvulcanized halogenated polyethylene, and a vulcanization agent capable of vulcanizing at least said halogenated elastomeric copolymer; and
   (b) masticating and shearing the blend resulting from step (a) at vulcanization conditions for a time sufficient to produce a vulcanized thermoplastic composition.

25. The process of claim 24, wherein said vulcanization agent is a vulcanization agent capable of covulcanizing said halogenated elastomeric copolymer and said halogenated polyethylene.

26. The process of claim 25, wherein said vulcanization agent is selected from the group consisting of a hexamethylene diamine carbamate, and a mercaptothiazole derivative.

27. The process of claim 24, wherein said vulcanization conditions include a temperature ranging from about the melting point of said polyolefin resin to about 250° C.

28. The process of claim 24, wherein a flame retarding additive is added before or after step (b).

29. The process of claim 28, wherein said flame retarding additive is a chlorinated paraffin oil, and wherein a portion of said oil is added before step (b).

30. The process of claim 28, wherein said flame retarding additive is a solid and wherein said solid is added after step (b).

31. The process of claim 24, wherein said flame retarding additive is selected from the group consisting of chlorinated paraffin oil, solid chlorinated organic compounds, and mixtures thereof.

32. The process of claim 31, wherein said polyolefin resin is polypropylene, said halogenated elastomeric copolymer is a brominated elastomeric copolymer, and said halogenated polyethylene is chlorinated polyethylene.

33. The process of claim 24, wherein said polyolefin resin is selected from the group consisting of polyethylene, polypropylene and mixtures thereof.

34. The process of claim 24, wherein said halogenated elastomeric copolymer is selected from the group consisting of a brominated elastomeric copolymer, a chlorinated elastomeric copolymer thereof.

35. The process of claim 24, wherein said halogenated copolymer of an isomonoolefin and a multiolefin is a halogenated copolymer of isobutylene and isoprene.

36. The process of claim 24, wherein said halogenated copolymer of an isomonoolefin and a para-alkylstyrene is a halogenated copolymer of isobutylene and para-methylstyrene.

37. The process of claim 24, wherein said halogenated polyethylene is selected from the group consisting of chlorinated polyethylene, brominated polyethylene and mixtures thereof.

38. The process of claim 24, wherein said polyolefin resin is polypropylene, said halogenated elastomeric copolymer is a brominated elastomeric copolymer, and said halogenated polyethylene is chlorinated polyethylene.

39. The process of claim 38, wherein said brominated elastomeric copolymer is selected from the group consisting of a brominated copolymer of isobutylene and isoprene, a brominated copolymer of isobutylene and para-methylstyrene, and mixtures thereof.

40. The process of claim 24, wherein said polyolefin resin is present in said composition in an amount ranging from about 12 to 40 weight percent, said halogenated elastomeric copolymer is present in an amount ranging from about 10 to 40 weight percent, and said halogenated polyethylene is present in an amount ranging from about 5 to 35 weight percent, based on the total composition.

41. The process of claim 24, wherein in step (b), said vulcanization conditions are conducted for a time sufficient to vulcanize at least partially said halogenated elastomeric copolymer.

42. The process of claim 24, wherein in step (b), said vulcanization conditions are conducted for a time sufficient to vulcanize at least partially said halogenated elastomeric copolymer and said halogenated polyethylene.

43. The process of claim 24, wherein in step (b), said vulcanization conditions are conducted for a time sufficient to vulcanize fully said halogenated elastomeric copolymer and said halogenated polyethylene.

* * * * *